United States Patent
Kaneda et al.

(10) Patent No.: US 11,959,251 B2
(45) Date of Patent: Apr. 16, 2024

(54) ELECTRIC WORK MACHINE

(71) Applicant: YANMAR POWER TECHNOLOGY CO., LTD., Osaka (JP)

(72) Inventors: Kensuke Kaneda, Chikugo (JP); Jun Terashima, Chikugo (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 17/845,252

(22) Filed: Jun. 21, 2022

(65) Prior Publication Data

US 2022/0314804 A1  Oct. 6, 2022

Related U.S. Application Data

(63) Continuation of application No. 17/050,349, filed as application No. PCT/JP2019/016570 on Apr. 18, 2019, now Pat. No. 11,383,602.

(30) Foreign Application Priority Data

Apr. 24, 2018  (JP) .................................. 2018-083100

(51) Int. Cl.
   *B60L 53/00*    (2019.01)
   *B60L 1/00*    (2006.01)
   (Continued)

(52) U.S. Cl.
   CPC .............. *E02F 9/2091* (2013.01); *B60L 1/00* (2013.01); *B60L 50/53* (2019.02); *B60L 50/60* (2019.02);
   (Continued)

(58) Field of Classification Search
   CPC .. B60L 1/00; B60L 53/00; B60L 50/60; B60L 1/003; B60L 50/53; B60L 2200/40;
   (Continued)

(56) References Cited

U.S. PATENT DOCUMENTS 5,659,240 A    8/1997  King
2009/0314557 A1*  12/2009  Takeuchi ................. B60K 1/04
                                                                180/65.1

(Continued)

FOREIGN PATENT DOCUMENTS

JP   070056/1990 U   5/1990
JP   2007-228715 A   9/2007

(Continued)

OTHER PUBLICATIONS

International Search Report dated May 21, 2019 issued in corresponding PCT Application PCT/JP2019/016570.

*Primary Examiner* — Lincoln D Donovan
*Assistant Examiner* — Alex W Lam
(74) *Attorney, Agent, or Firm* — NORTON ROSE FULBRIGHT US LLP

(57) ABSTRACT

An excavator comprising: an electric motor having a commercial power supply and a battery as the drive power sources therefor; and a hydraulic actuator having a hydraulic pump driven by the electric motor, as the hydraulic source therefor. The excavator has: a first power supply mode in which the electric motor is driven while the battery is being charged by the commercial power supply; and a second power supply mode in which the electric motor is driven only by the battery. A power supply cable for supplying power from the commercial power supply is connected to a power supply port and, if the electric motor has stopped operating, the excavator moves from the second power supply mode to the first power supply mode.

10 Claims, 11 Drawing Sheets

(51) Int. Cl.
  *B60L 50/53* (2019.01)
  *B60L 50/60* (2019.01)
  *E02F 9/20* (2006.01)
  *E02F 9/22* (2006.01)
  *H02J 7/34* (2006.01)

(52) U.S. Cl.
  CPC ............... *B60L 53/00* (2019.02); *E02F 9/22* (2013.01); *H02J 7/34* (2013.01); *H02J 2310/48* (2020.01)

(58) Field of Classification Search
  CPC .... B60L 50/66; B60L 58/22; B60L 2240/547; B60L 2240/80; B60L 2250/16; B60L 53/14; B60L 50/61; B60L 58/19; E02F 9/22; E02F 9/2282; E02F 9/2285; E02F 9/2235; E02F 9/2228; E02F 9/2091; H02J 7/34; H02J 7/0014; H02J 7/0047; H02J 7/1446; H02J 7/0019; Y02T 10/7072; Y02T 90/14; Y02T 10/70; Y02T 10/72; H02P 27/06; Y02E 60/10; H01M 10/44; H01M 10/48; H01M 10/482; H01M 2010/4271; H01M 2220/20; B60Y 2200/41

See application file for complete search history.

(56) References Cited

U.S. PATENT DOCUMENTS

| | | | |
|---|---|---|---|
| 2016/0052409 A1* | 2/2016 | Sun | B60L 53/62 320/109 |
| 2016/0137149 A1* | 5/2016 | Kamachi | B60L 58/10 307/10.1 |
| 2019/0252909 A1* | 8/2019 | Sugiyama | H02J 7/0068 |

FOREIGN PATENT DOCUMENTS

| | | |
|---|---|---|
| JP | 2008-308881 A | 12/2008 |
| JP | 2013-129976 A | 7/2013 |
| JP | 2015-162968 A | 9/2015 |
| JP | 2017-158235 A | 9/2017 |

* cited by examiner

COMMERCIAL POWER SUPPLY MODE

CHARGING MODE

ELECTRIC WORK MACHINE

CROSS REFERENCE TO RELATED APPLICATIONS

This application is a continuation of U.S. patent application Ser. No. 17/050,349 filed Oct. 23, 2020, which is a national stage application pursuant to 35 U.S.C. § 371 of International Application No. PCT/JP2019/016570, filed Apr. 18, 2019, which claims priority under 35 U.S.C. § 119 to JP Pat. App. No. 2018-083100, filed Apr. 24, 2018, the disclosures of which are hereby incorporated by reference in their entireties.

TECHNICAL FIELD

The present invention relates to an electric work machine.

BACKGROUND ART

In JP Unexamined Pat. App. Pub. No. 2007-228715 ("Patent Literature 1"), a construction machine on which a power supply system for driving an electric motor with a commercial power supply and a battery is mounted is disclosed. This power supply system includes a power supply switching device that switches an electrical circuit between an electrical circuit that supplies a direct-current power supply from the battery to an inverter converting direct-current power into any alternating-current power and supplying the alternating-current power to the electric motor and an electrical circuit that converts the alternating-current power supplied from the commercial power supply into the direct-current power via an AC/DC converting section and supplies the direct-current power to the inverter.

In JP Unexamined Pat. App. Pub. No. 2008-308881 ("Patent Literature 2"), in an electric excavator having: a mode for driving an electric motor while a battery is being charged by an external power supply; and a mode for driving the electric motor by the battery only, a technique of shifting to the mode for driving the electric motor while the battery is being charged by the external power supply by connecting the external power supply during the mode for driving the electric motor by the battery only is disclosed.

In Patent Literature 1, the commercial power supply and the battery are selected. Thus, in the case where the electric motor is driven only with the power from the commercial power supply, the power for driving the electric motor depends on the commercial power supply, which leads to such a problem that sufficient drive power cannot be obtained in a case of work requiring the high drive power.

In Patent Literature 2, a power supply cable for supplying the power from the external power supply is connected to the machine that is being driven by the battery only. Thus, there is a risk of arc discharge. Furthermore, act of connecting the power supply cable to the machine that is being driven by the battery only possibly causes an accidental contact due to turning and traveling motion of the machine.

SUMMARY OF THE INVENTION

The present invention has been made in view of the above problems and therefore has a purpose of providing an electric work machine capable of inhibiting act of connecting a power supply cable from an external power supply to the machine that is being driven and preventing arc discharge even when the power supply cable is connected.

An electric work machine according to the present invention is an electric work machine including: an electric motor having an external power supply and a battery as drive power sources; and a hydraulic actuator having, as a hydraulic pressure source, a hydraulic pump driven by the electric motor, and has: a first power supply mode in which the electric motor is driven while the battery is being charged by the external power supply; and a second power supply mode in which the electric motor is driven by the battery only.

In the case where a power supply cable for supplying electric power from the external power supply is connected to a power supply port and rotation of the electric motor is stopped, the second power supply mode is shifted to the first power supply mode.

In the present invention, in the case where the power supply cable for supplying the electric power from the external power supply is connected to the power supply port, where the rotation of the electric motor is stopped, and where a cut-off lever for restricting an operation of the hydraulic actuator is rotated upward by blocking a pilot pressure used to operate the hydraulic actuator, so as to restrict the operation of the hydraulic actuator, the second power supply mode may be shifted to the first power supply mode.

In the present invention, in the case where the power supply cable is disconnected from the power supply port, the first power supply mode may be shifted to the second power supply mode.

According to the present invention, the second power supply mode is not shifted to the first power supply mode unless the rotation of the electric motor is stopped. Therefore, it is possible to inhibit act of connecting the power supply cable from the external power supply to the machine that is being driven. Even in the case where the power supply cable is connected, arc discharge does not occur.

DESCRIPTION OF EMBODIMENTS

A description will hereinafter be made on embodiments of the present invention with reference to the drawings.

Figure 1:
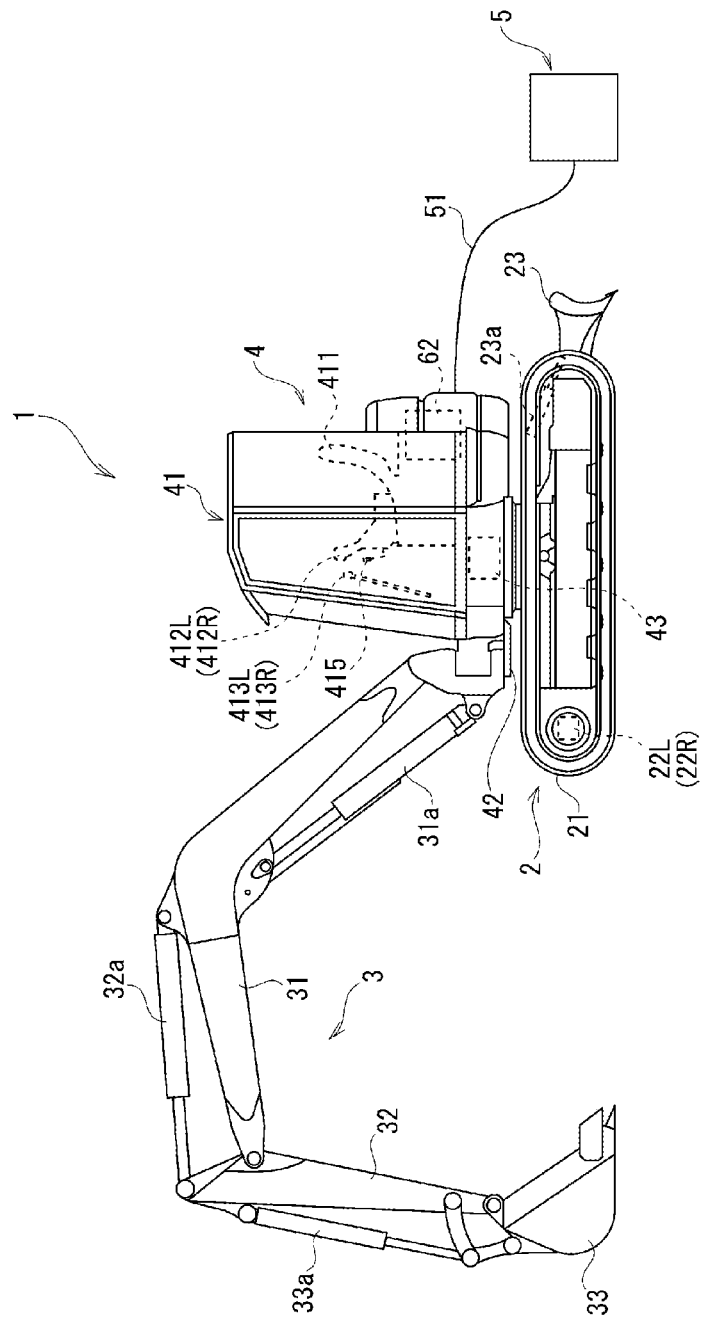
FIG. 1 is a side view illustrating an electric work machine according to this embodiment.
Figure 2:
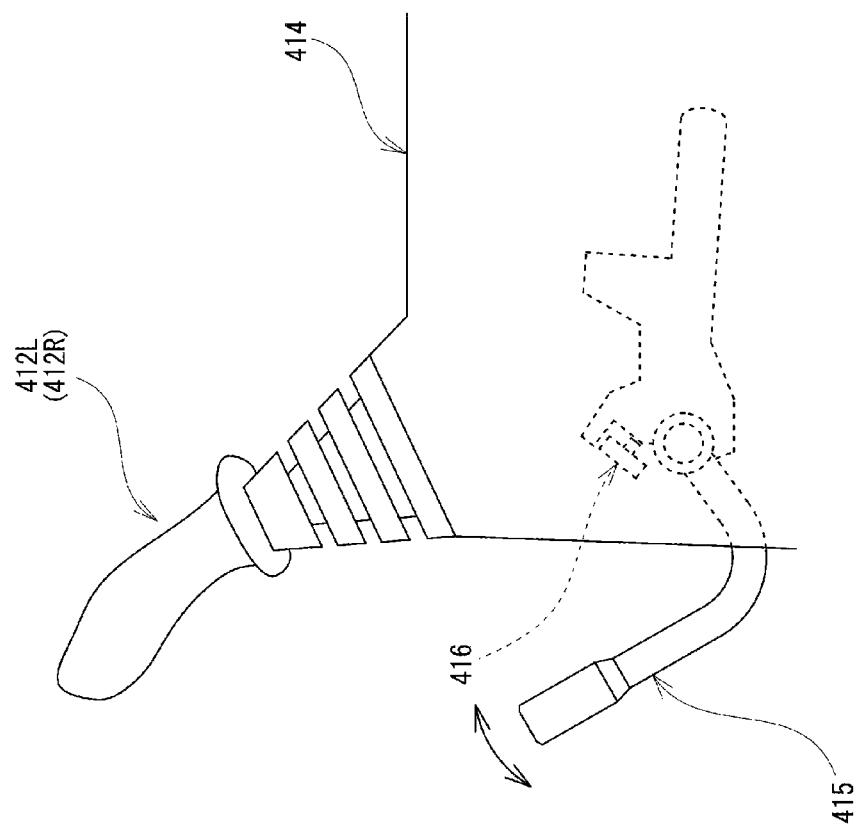
FIG. 2 is a side view in which a portion of the electric work machine around a cut-off lever is enlarged.

First, a description will be made on a schematic structure of an excavator 1 as an example of the electric work machine with reference to FIG. 1 and FIG. 2. However, the example of the electric work machine is not limited to the excavator 1, and may be another vehicle such as a wheel loader. The excavator 1 includes a lower travel body 2, a work unit 3, and an upper turning body 4.

The lower travel body 2 includes a left and right pair of crawlers 21, 21 and a left and right pair of travel motors 22L, 22R. The left and right travel motors 22L, 22R as hydraulic motors drive the left and right crawlers 21, 21, respectively. In this way, the excavator 1 can travel forward and backward. In addition, the lower travel body 2 is provided with a blade 23 and a blade cylinder 23a that is a hydraulic cylinder for rotating the blade 23 in a vertical direction.

The work unit 3 includes a boom 31, an arm 32, and a bucket 33 and independently drives these components to enable excavation work of gravel or the like. The boom 31, the arm 32, and the bucket 33 each correspond to a work section, and the excavator 1 has a plurality of the work sections.

The boom 31 has a base end portion that is supported by a front portion of the upper turning body 4, and is rotated by a boom cylinder 31a movable in a freely extendable/contractible manner. The arm 32 has a base end portion that is supported by a tip portion of the boom 31, and is rotated by an arm cylinder 32a movable in a freely extendable/contractible manner. The bucket 33 has a base end portion that is supported by a tip portion of the arm 32, and is rotated by a bucket cylinder 33a movable in a freely extendable/contractible manner. Each of the boom cylinder 31a, the arm cylinder 32a, and the bucket cylinder 33a is constructed of a hydraulic cylinder.

The upper turning body 4 is configured to be turnable with respect to the lower travel body 2 via a turning bearing (not illustrated). In the upper turning body 4, an operation section 41, a turn table 42, a turning motor 43, a battery 62, and the like are arranged. With drive power of the turning motor 43 as a hydraulic motor, the upper turning body 4 turns via the turning bearing (not illustrated). In addition, plural hydraulic pumps (not illustrated in FIG. 1) that are driven by an electric motor are disposed in the upper turning body 4. These hydraulic pumps supply hydraulic oil to the hydraulic motors (the travel motors 22L, 22R and the turning motor 43) and the hydraulic cylinders (the blade cylinder 23a, the boom cylinder 31a, the arm cylinder 32a, and the bucket cylinder 33a). The hydraulic motors and the hydraulic cylinders will collectively be referred to as hydraulic actuators.

An operator seat 411 is arranged in the operation section 41. A left and right pair of work operation levers 412L, 412R is arranged on left and right sides of the operator seat 411, and a pair of travel levers 413L, 413R is arranged in front of the operator seat 411. When seated on the operator seat 411 and operating the work operation levers 412L, 412R, the travel levers 413L, 413R, or the like, an operator can control each of the hydraulic actuators, which allows travel, turning, work, or the like.

The work operation levers 412L, 412R are integrally attached to a lever stand 414. From this lever stand 414, a cut-off lever 415 for turning on/off an operation of the work unit 3 using the work operation levers 412L, 412R extends forward. The cut-off lever 415 is configured to be vertically rotatable, and is configured to be brought into a state of allowing actuation of the work unit 3 with operations of the work operation levers 412L, 412R when being rotated downward and to be brought into a locked state where the work unit 3 is not actuated even with the operations of the work operation levers 412L, 412R when being rotated upward. In the lever stand 414, a cut-off switch 416 is provided to detect a rotation position of the cut-off lever 415. The cut-off switch 416 is configured to be turned on when the cut-off lever 415 is rotated downward and to be turned off when the cut-off lever 415 is rotated upward.

The upper turning body 4 is provided with a power supply port, which is not illustrated. When a power supply cable 51 for a commercial power supply 5 (corresponding to the external power supply) is connected to this power supply port, the commercial power supply 5 can be connected to a power supply system 6, which will be described below.

The hydraulic pump that supplies the hydraulic oil to the hydraulic actuator is configured to be actuated by the electric motor that is driven by electric power, and the commercial power supply 5 and the battery 62 supply the electric power to the electric motor.

Figure 3:
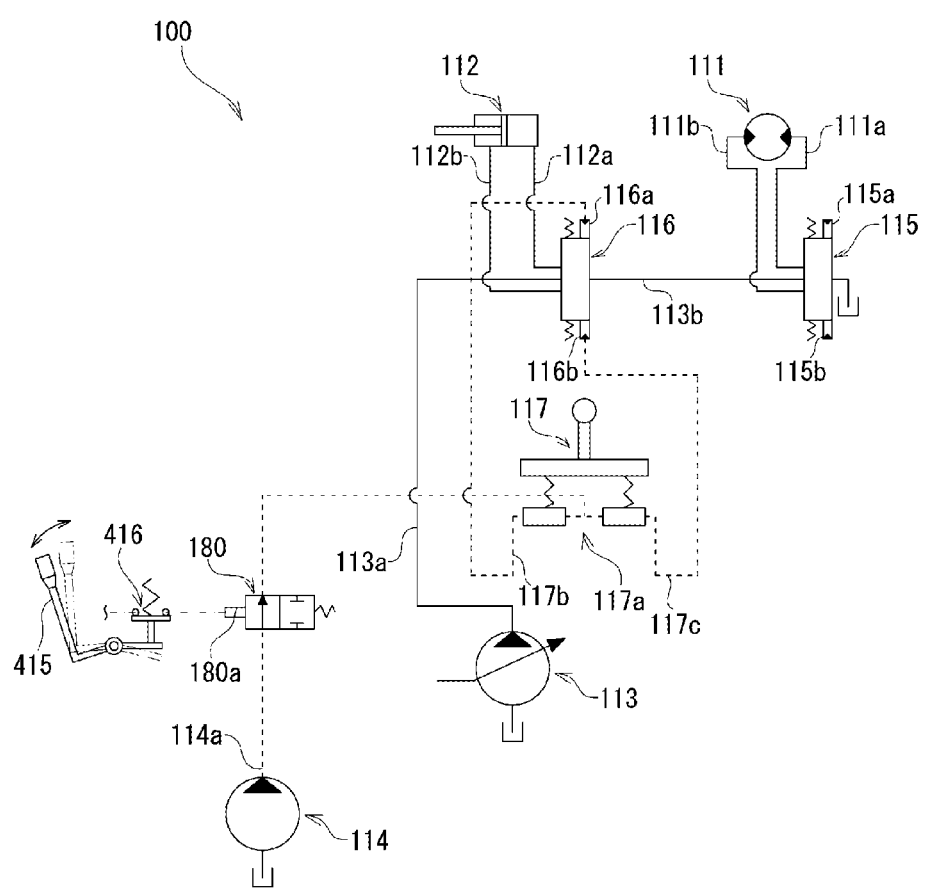
FIG. 3 is a view illustrating a hydraulic circuit of the electric work machine.

FIG. 3 illustrates a hydraulic circuit 100 that is mounted on the excavator 1. The hydraulic circuit 100 includes a first actuator 111, a second actuator 112, a hydraulic pump 113, a pilot pump 114, a first direction switching valve 115, a second direction switching valve 116, and an operation device 117.

The first actuator 111 is a hydraulic motor that is driven by the hydraulic oil supplied from the hydraulic pump 113. Examples of the first actuator 111 are the travel motors 22L, 22R. The second actuator 112 is a hydraulic cylinder that is driven by the hydraulic oil supplied from the hydraulic pump 113. An example of the second actuator 112 is the boom cylinder 31a.

The hydraulic pump 113 is driven by the electric motor, which is not illustrated, to discharge the hydraulic oil. The hydraulic oil discharged from the hydraulic pump 113 is supplied to the first direction switching valve 115 and the second direction switching valve 116 via an oil passage 113a and an oil passage 113b. In FIG. 3, the oil passages for the hydraulic oil supplied from the hydraulic pump 113 to the first actuator 111 and the second actuator 112 are indicated by solid lines.

The first direction switching valve 115 is a direction switching valve of a pilot type capable of switching a direction of the hydraulic oil supplied to the first actuator 111 and adjusting a flow rate thereof. The second direction switching valve 116 is a direction switching valve of the pilot type capable of switching a direction of the hydraulic oil supplied to the second actuator 112 and adjusting a flow rate thereof.

The pilot pump 114 discharges pilot hydraulic oil as a command input to the first direction switching valve 115 and the second direction switching valve 116. In FIG. 3, oil passages for the pilot hydraulic oil supplied from the pilot pump 114 to the second direction switching valve 116 are indicated by broken lines (here, oil passages for the pilot hydraulic oil supplied from the pilot pump 114 to the first direction switching valve 115 are not illustrated). The pilot pump 114 generates a pilot pressure to be applied to the first direction switching valve 115 and the second direction switching valve 116. The pilot pump 114 is driven by the electric motor, which is not illustrated, and discharges the hydraulic oil so as to generate the pilot pressure in an oil passage 114a.

The first direction switching valve 115 can be switched to any of plural positions by sliding a spool. In the case where the pilot pressure is applied to none of a pilot port 115a and a pilot port 115b of the first direction switching valve 115, an urging force of a spring keeps the first direction switching valve 115 at a neutral position. In the case where the first direction switching valve 115 is at the neutral position, the hydraulic oil is not supplied from the oil passage 113b to the first actuator 111.

On the other hand, in the case where the pilot pressure is applied to the pilot port 115a or the pilot port 115b of the first direction switching valve 115, the first direction switching valve 115 is switched from the neutral position to another position, and the hydraulic oil is supplied to the first actuator 111 via an oil passage 111a or an oil passage 111b. With the hydraulic oil that is supplied via the oil passage 111a or the oil passage 111b, the first actuator 111 is rotationally driven in a positive direction or a reverse direction.

The second direction switching valve 116 can be switched to any of plural positions by sliding a spool. In the case where the pilot pressure is applied to none of a pilot port 116a and a pilot port 116b of the second direction switching valve 116, an urging force of a spring keeps the second direction switching valve 116 at a neutral position. In the case where the second direction switching valve 116 is at the neutral position, the hydraulic oil is not supplied from the oil passage 113a to the second actuator 112.

On the other hand, in the case where the pilot pressure is applied to the pilot port 116a or the pilot port 116b of the second direction switching valve 116, the second direction switching valve 116 is switched from the neutral position to another position, and the hydraulic oil is supplied to the second actuator 112 via an oil passage 112a or an oil passage 112b. With the hydraulic oil that is supplied via the oil passage 112a or the oil passage 112b, the second actuator 112 is contracted.

The operation device 117 has a remote control valve 117a for switching a direction and the pressure of the pilot hydraulic oil to be supplied to the second direction switching valve 116. Examples of the operation device 117 are the work operation levers 412L, 412R. The remote control valve 117a is connected to the oil passage 114a. The remote control valve 117a is also connected to the pilot port 116a and the pilot port 116b of the second direction switching valve 116 via an oil passage 117b and an oil passage 117c, respectively. The remote control valve 117a supplies, as the pilot hydraulic oil, the hydraulic oil that is supplied from the pilot pump 114 via the oil passage 114a to the second direction switching valve 116. When the operation device 117 is operated, it is possible to switch the second direction switching valve 116, to switch the direction of the hydraulic oil to be supplied to the second actuator 112, and to adjust the flow rate of such hydraulic oil.

An on/off valve 180 is provided in the oil passage 114a between the pilot pump 114 and the remote control valve 117a. The on/off valve 180 is constructed of an electromagnetic valve and includes a solenoid 180a. The solenoid 180a is connected to the cut-off switch 416. As illustrated in FIG. 3, when the cut-off lever 415 is rotated downward and turns on the cut-off switch 416, the solenoid 180a is energized to bring the on/off valve 180 into a communication state. As a result, the hydraulic oil from the pilot pump 114 is supplied to the remote control valve 117a via the on/off valve 180. On the other hand, as illustrated by two-dot chain lines in FIG. 3, when the cut-off lever 415 is rotated upward, the cut-off switch 416 is turned off by an urging force of a spring, the solenoid 180a is no longer energized, and the on/off valve 180 is brought into a shutoff state by an urging force of a spring. In this way, the hydraulic oil from the pilot pump 114 is no longer supplied to the remote control valve 117a, and the pilot pressure is no longer applied to the second direction switching valve 116 even with the operation of the operation device 117. As a result, the hydraulic oil is not supplied to the second actuator 112, and an operation of the second actuator 112 is restricted. That is, when being rotated downward, the cut-off lever 415 is brought into a state of allowing the actuation of the work unit 3 with the operation of the operation device 117. When being rotated upward, the cut-off lever 415 is brought into a locked state where the work unit 3 is not actuated even with the operation of the operation device 117.

Figure 4:
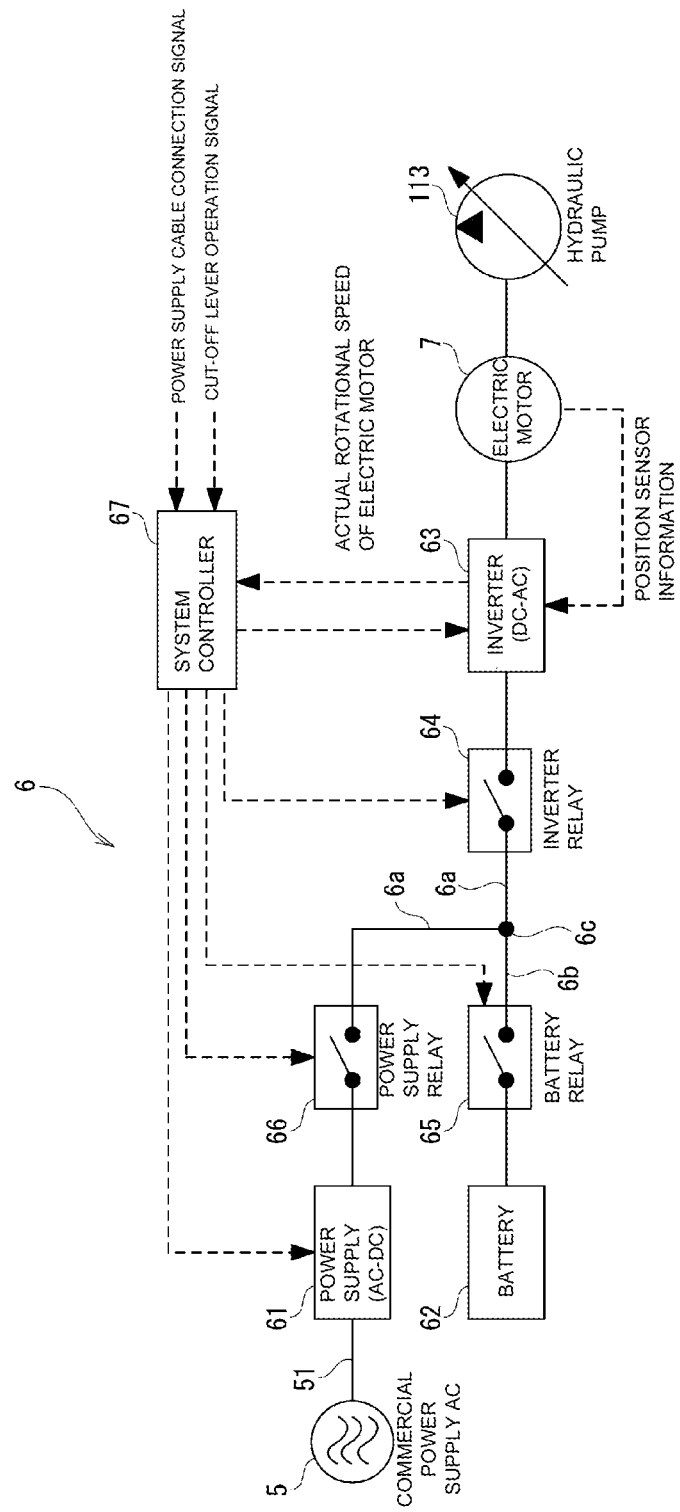
FIG. 4 is a block diagram of a power supply system mounted on the electric work machine.

A description will be made on the power supply system 6 that is mounted on the excavator 1 and supplies the electric power to the electric motor 7 with reference to FIG. 4. The power supply system 6 includes: a power supply 61 that converts an alternating-current power supply voltage of the commercial power supply 5 into a direct-current power supply voltage; a battery 62 that charges or discharges the electric power from the power supply 61; an inverter 63 that converts the direct-current power supply voltage into the alternating-current power supply voltage; a first electrical circuit 6a that supplies the electric power from the power supply 61 to the inverter 63; a second electrical circuit 6b that joins the first electrical circuit 6a from the battery 62; an inverter relay 64 arranged between the inverter 63 and a junction point 6c between the first electrical circuit 6a and the second electrical circuit 6b; a battery relay 65 arranged between the junction point 6c and the battery 62; and a power supply relay 66 arranged between the junction point 6c and the power supply 61.

The power supply 61 converts the alternating-current voltage that is supplied from the commercial power supply 5 via the power supply cable 51 into the direct-current voltage. This direct-current voltage is supplied to the battery 62 via the power supply relay 66 and the battery relay 65, and the battery 62 is thereby charged. The direct-current voltage of the power supply 61 is also supplied to the inverter 63 via the power supply relay 66 and the inverter relay 64.

The battery 62 supplies the direct-current voltage to the inverter 63 via the battery relay 65 and the inverter relay 64. An example of the battery 62 is a lithium-ion battery.

The inverter 63 converts the direct-current voltage, which is supplied from the power supply 61 and/or the battery 62, into the alternating-current voltage. This alternating-current voltage is supplied to an electric motor 7. The electric motor 7 actuates the hydraulic pump 113. Although only the hydraulic pump 113 is illustrated in FIG. 4, the plural hydraulic pumps may be provided.

The power supply system 6 also includes a system controller 67 for controlling the power supply system 6. The system controller 67 executes control of the electric power to be supplied to the electric motor 7, control of charging of the battery 62, and the like. More specifically, the system controller 67 controls the power supply 61, the inverter 63, the inverter relay 64, the battery relay 65, the power supply relay 66, and the like so as to be able to drive the electric motor 7 and charge the battery 62.

Figure 5A:
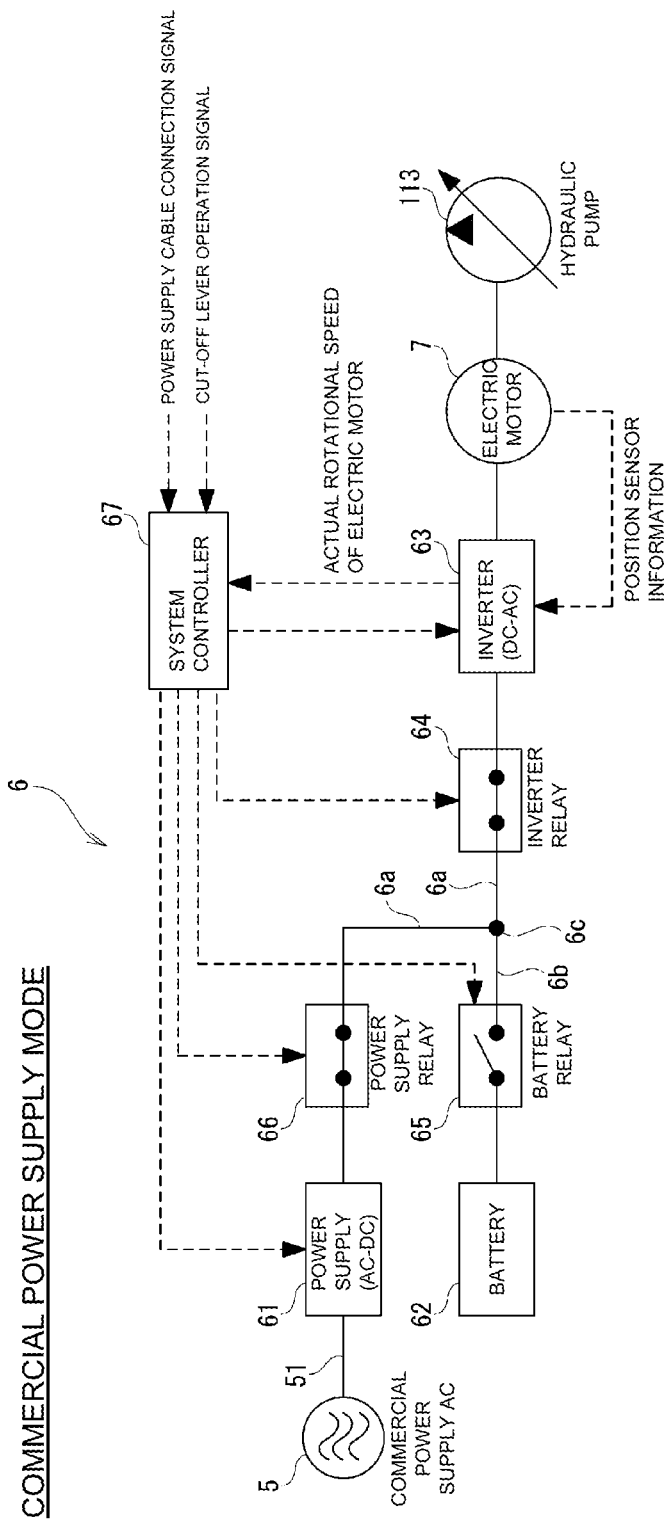
FIG. 5A is a block diagram of the power supply system implementing a commercial power supply mode.

The power supply system 6 has plural power supply modes illustrated in FIG. 5A to FIG. 5D. As illustrated in FIG. 5A, the power supply system 6 can have a commercial power supply mode, in which the electric power is only supplied from the commercial power supply 5 to drive the electric motor 7, by contacting contacts of the inverter relay 64 and the power supply relay 66 and separating contacts of the battery relay 65. In this way, a frequency of use of the battery 62 can be reduced, and life of the battery 62 can thereby be extended. In addition, even in the case where the battery 62 is brought into an abnormal state, the work can be continued by using the commercial power supply 5 in the commercial power supply mode.

Figure 5B:
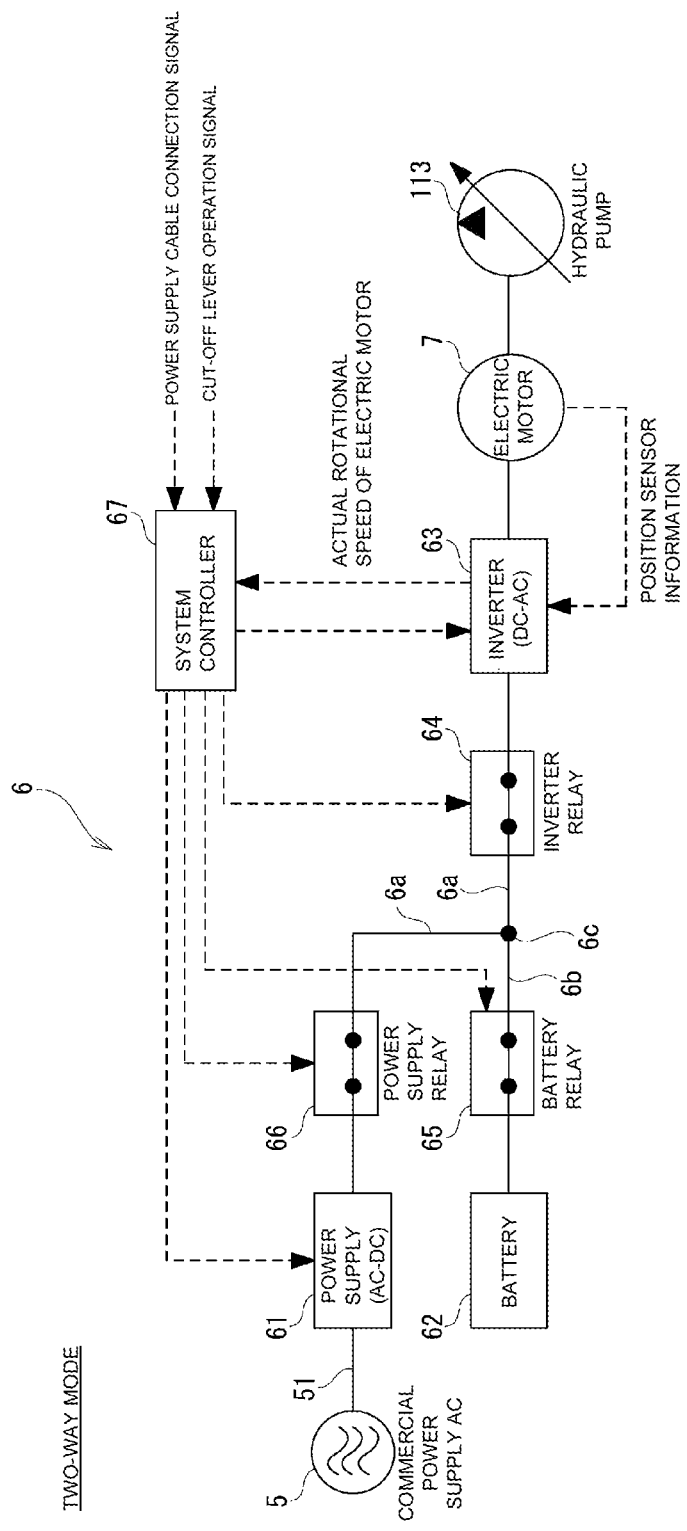
FIG. 5B is a block diagram of the power supply system implementing a two-way mode.

As illustrated in FIG. 5B, the power supply system 6 can have a two-way mode (corresponding to the first power supply mode), in which the electric power is supplied from the battery 62 and the commercial power supply 5 to drive the electric motor 7, by contacting the three contacts of the inverter relay 64, the power supply relay 66, and the battery relay 65.

Figure 5C:
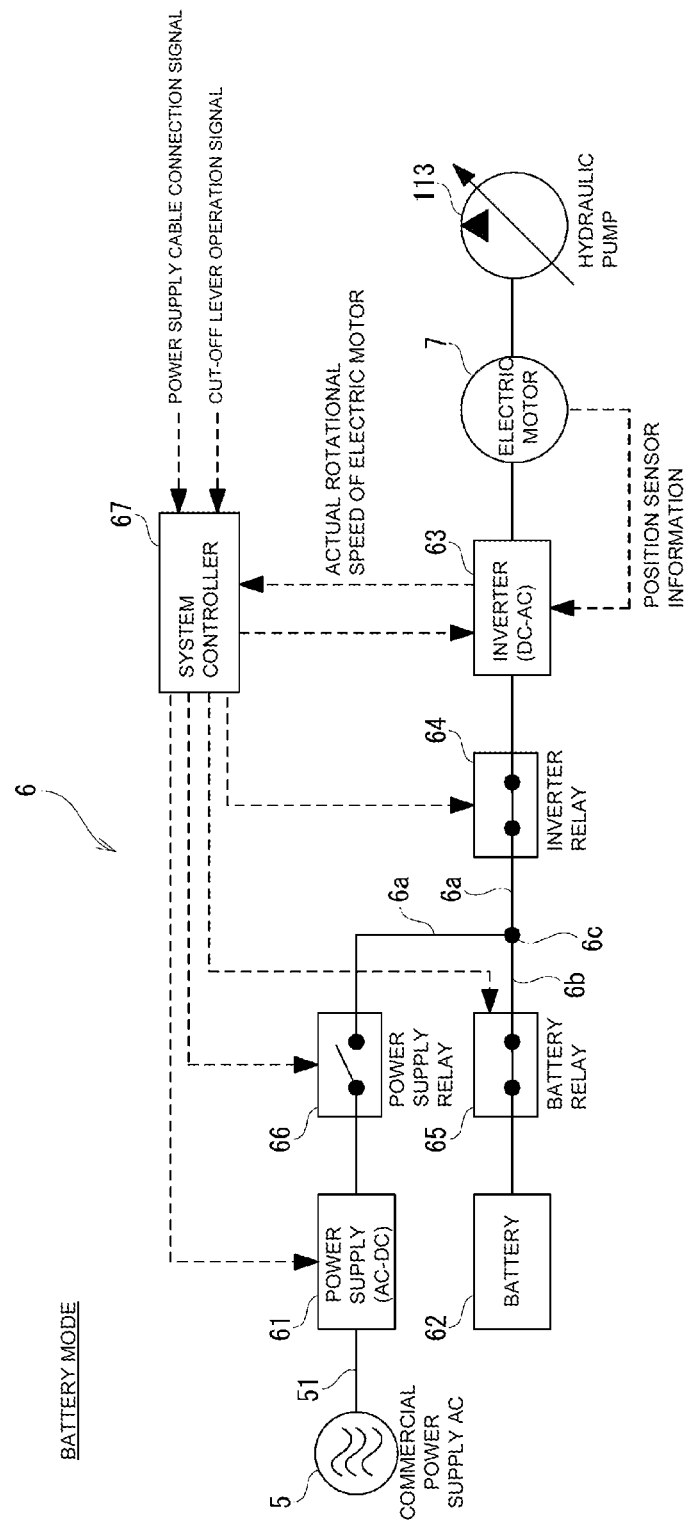
FIG. 5C is a block diagram of the power supply system implementing a battery mode.

As illustrated in FIG. 5C, the power supply system 6 can have a battery mode (corresponding to the second power supply mode), in which the electric power is only supplied from the battery 62 to drive the electric motor 7, by contacting the contacts of the inverter relay 64 and the battery relay 65 and separating the contact of the power supply relay 66.

Figure 5D:
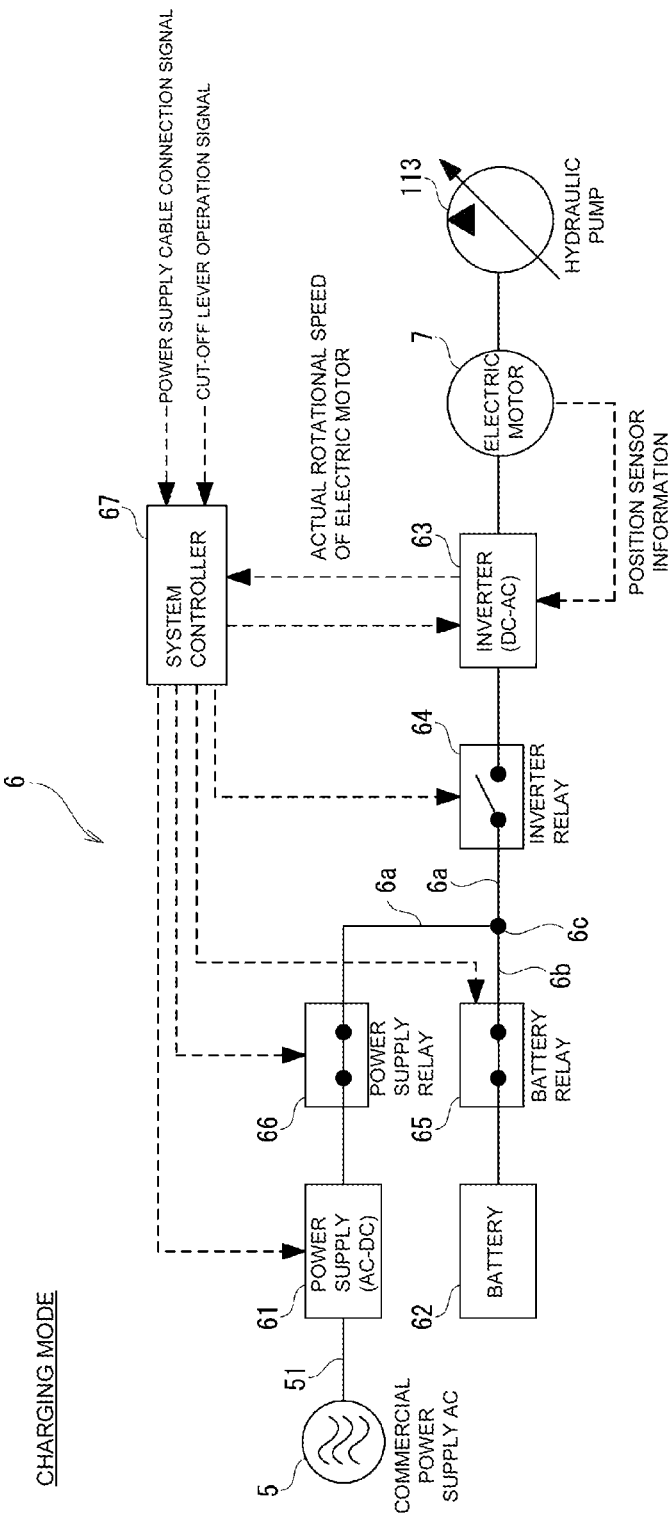
FIG. 5D is a block diagram of the power supply system implementing a charging mode.

As illustrated in FIG. 5D, the power supply system 6 can have a charging mode, in which only the battery 62 is charged by using the commercial power supply 5, by contacting the contacts of the battery relay 65 and the power supply relay 66 and separating the contact of the inverter relay 64.

Figure 6:
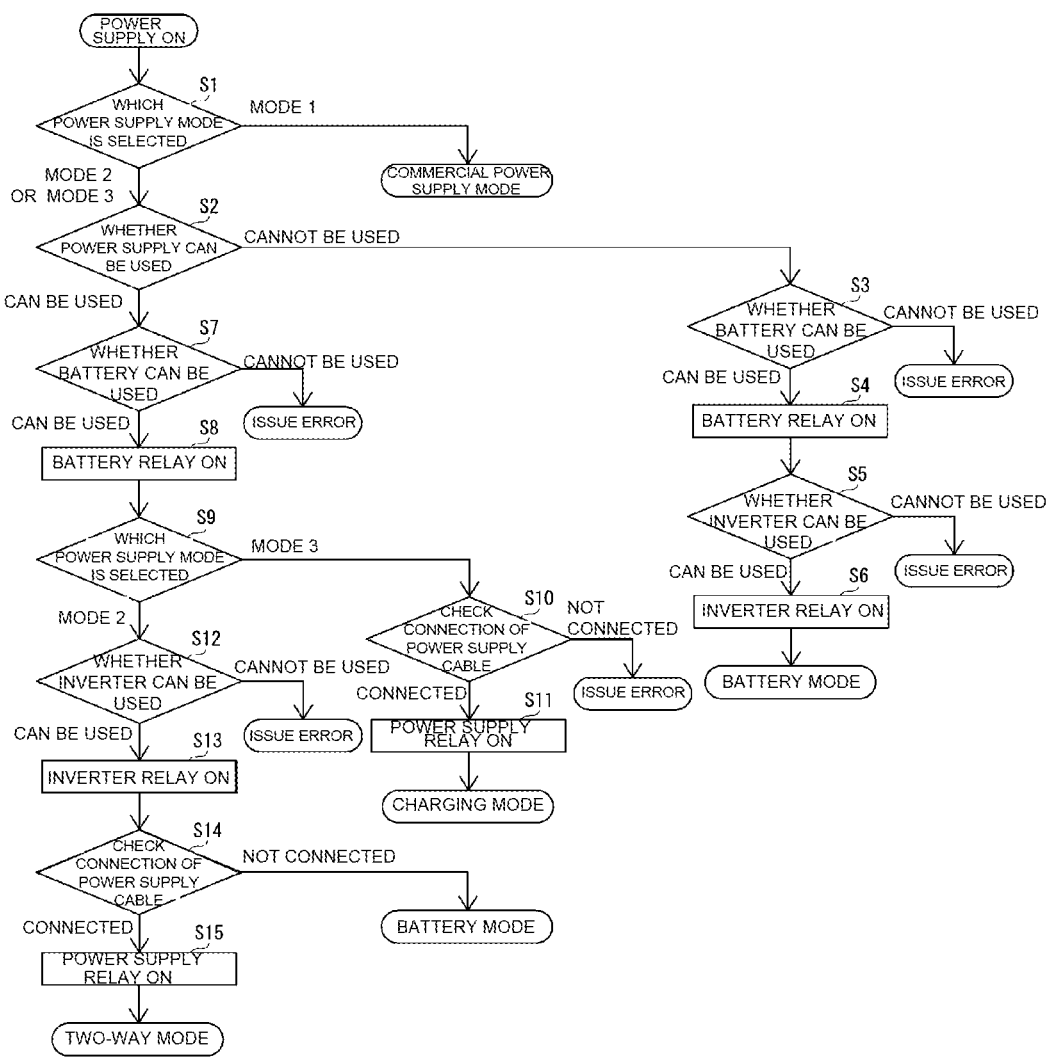
FIG. 6 is a flowchart illustrating a procedure of switching control of a power supply mode.

Next, a description will be made on a control method for switching the power supply mode described above. FIG. 6 is a flowchart illustrating a procedure of switching control of the power supply mode. First, the operator turns on the power supply. Next, the operator selects the power supply mode by using a power supply mode selection switch. In step S1, it is determined which power supply mode is selected. In the case where a mode 1 is selected, the system controller 67 turns on the inverter relay 64 and the power supply relay 66 and turns off the battery relay 65 so as to implement the commercial power supply mode.

Meanwhile, in the case where a mode 2 or a mode 3 is selected in step S1, in next step S2, it is determined whether the power supply 61 can be used. The power supply 61 includes a control section that determines whether the power supply 61 itself can be used and, if cannot be used, sends an error signal to the system controller 67. In the case where the system controller 67 receives the error signal from the power supply 61, the system controller 67 determines that the power supply 61 cannot be used.

If it is determined in step S2 that the power supply 61 "cannot be used", in next step S3, it is determined whether the battery 62 can be used. The battery 62 includes a control section that determines whether the battery 62 itself can be used and, if cannot be used, sends an error signal to the system controller 67. In the case where the system controller 67 receives the error signal from the battery 62, the system controller 67 determines that the battery 62 cannot be used. If it is determined in step S3 that the battery 62 "cannot be used", the system controller 67 issues an error.

On the other hand, if it is determined in step S3 that the battery 62 "can be used", in next step S4, the system controller 67 turns on the battery relay 65. Next, in step S5, it is determined whether the inverter 63 can be used. The inverter 63 includes a control section that determines whether the inverter 63 itself can be used and, if cannot be used, sends an error signal to the system controller 67. In the case where the system controller 67 receives the error signal from the inverter 63, the system controller 67 determines that the inverter 63 cannot be used. If it is determined in step S5 that the inverter 63 "cannot be used", the system controller 67 issues an error.

On the other hand, if it is determined in step S5 that the inverter 63 "can be used", in next step S6, the system controller 67 turns on the inverter relay 64. In this way, it is possible to implement the battery mode (the second power supply mode) in which the electric power is supplied only from the battery 62 to drive the electric motor 7.

If it is determined in step S2 that the power supply 61 "can be used", in next step S7, it is determined whether the battery 62 can be used. If it is determined in step S7 that the battery 62 "cannot be used", the system controller 67 issues the error. On the other hand, if it is determined in step S7 that the battery 62 "can be used", in next step S8, the system controller 67 turns on the battery relay 65.

Next, in step S9, it is determined which power supply mode is selected. If it is determined that the mode 3 is selected, in next step S10, connection of the power supply cable 51 is checked. When the power supply cable 51 is connected to the power supply port, the power supply 61 detects this and sends a connection signal to the system controller 67. In the case where the system controller 67 receives the connection signal from the power supply 61, the system controller 67 determines that the power supply cable 51 is connected to the power supply port. If it is determined in step S10 that the power supply cable 51 is "not connected", the system controller 67 issues an error.

On the other hand, if it is determined in step S10 that the power supply cable 51 is "connected," in next step S11, the power supply relay 66 is turned on. In this way, it is possible to implement the charging mode in which only the battery 62 is charged by using the commercial power supply 5.

If it is determined in step S9 that the mode 2 is selected, in next step S12, it is determined whether the inverter 63 can be used. If the inverter 63 cannot be used, the system controller 67 issues the error. On the other hand, if it is determined in step S12 that the inverter 63 can be used, in next step S13, the system controller 67 turns on the inverter relay 64.

Next, in step S14, the connection of the power supply cable 51 is checked. If it is determined in step S14 that the power supply cable 51 is "not connected", the battery mode (the second power supply mode), in which the electric power is supplied only from the battery 62 to drive the electric motor 7, is implemented.

On the other hand, if it is determined in step S14 that the power supply cable 51 is "connected," in next step S15, the power supply relay 66 is turned on. In this way, it is possible to implement the two-way mode (the first power supply mode) in which the electric power is supplied from the battery 62 and the commercial power supply 5 to drive the electric motor 7.

Figure 7:
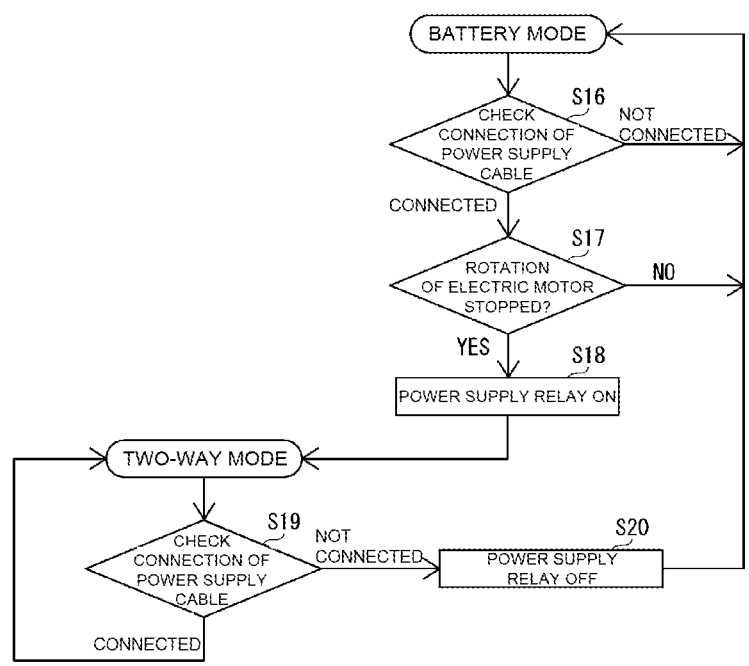
FIG. 7 is a flowchart illustrating a procedure of switching control between the two-way mode and the battery mode.

Next, a description will be made on a control method for switching between the two-way mode and the battery mode with reference to FIG. 7. In a state of the battery mode, in step S16, the connection of the power supply cable 51 is checked. If it is determined in step S16 that the power supply cable 51 is "not connected", the battery mode continues.

On the other hand, if it is determined in step S16 that the power supply cable 51 is "connected," in next step S17, it is determined whether the rotation of the electric motor 7 is stopped. The electric motor 7 is provided with a position sensor. The inverter 63 receives information on the position sensor from the electric motor 7, calculates a rotational speed of the electric motor 7, and sends information on the rotational speed of the electric motor 7 to the system controller 67. Based on the information on the rotational speed of the electric motor 7, which is received from the inverter 63, the system controller 67 can determine whether the rotation of the electric motor 7 is stopped. If it is determined "NO" in step S17 that the rotation of the electric motor 7 is not stopped, the battery mode continues.

On the other hand, if it is determined "YES" in step S17 that the rotation of the electric motor 7 is stopped, in next step S18, the power supply relay 66 is turned on. In this way, the battery mode can be switched to the two-way mode.

Meanwhile, in the two-way mode, in step S19, the connection of the power supply cable 51 is checked. If it is determined in step S19 that the power supply cable 51 is "connected", the two-way mode continues.

On the other hand, if it is determined in step S19 that the power supply cable 51 is "not connected," in next step S20, the power supply relay 66 is turned off. In this way, the two-way mode can be switched to the battery mode.

Figure 8:
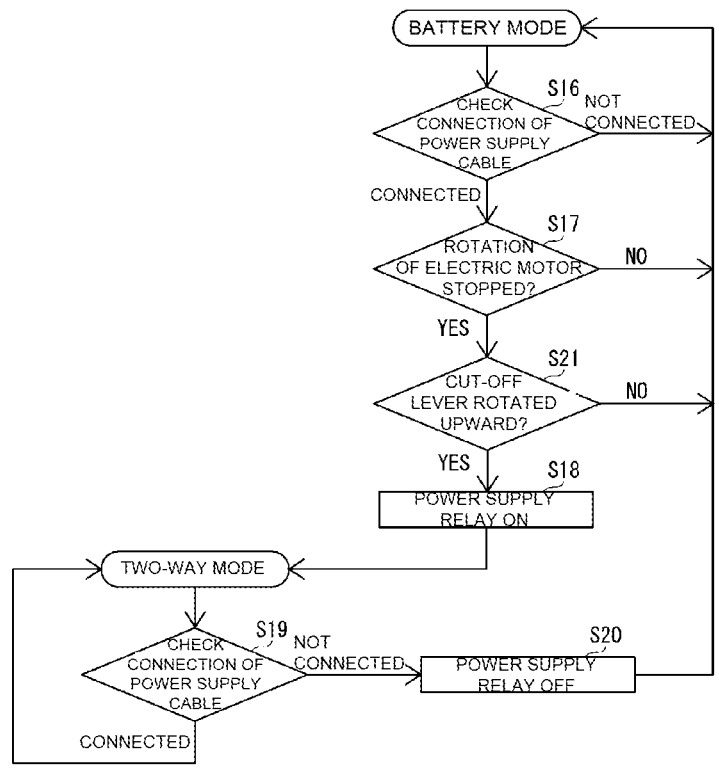
FIG. 8 is a flowchart illustrating a procedure of the switching control between the two-way mode and the battery mode according to another embodiment.

As illustrated in FIG. 8, when the battery mode is switched to the two-way mode, in addition to checking of the connection of the power supply cable 51 and checking of the stop of the rotation of the electric motor 7, it may be determined whether the cut-off lever 415 is rotated upward, and the operation of the hydraulic actuator is thereby restricted. Based on information from the cut-off switch 416 on whether the cut-off lever 415 is rotated upward or downward, the system controller 67 can determine whether the cut-off lever 415 is rotated upward. If it is determined "YES" in step S17, in next step S21, it is determined whether the cut-off lever 415 is rotated upward. If it is determined "NO" in step S21 that the cut-off lever 415 is not rotated downward, the battery mode continues. On the other hand, if it is determined "YES" that the cut-off lever 415 is rotated upward, in next step S18, the power supply relay 66 is turned on.

The description has been made so far on the embodiments of the present invention with reference to the drawings. However, it should be considered that the specific configuration is not limited to that described in each of these embodiments. The scope of the present invention is indicated not only by the description of the above embodiments but also by the claims and further includes all modifications that fall within and are equivalent to the scope of the claims.

DESCRIPTION OF REFERENCE NUMERALS 1, excavator
5, commercial power supply
51, power supply cable
6, power supply system
7, electric motor
62, battery
112, second actuator
113, hydraulic pump
415, cut-off lever

The invention claimed is:

1. An electric work machine including:
an electric motor configured to receive power from a battery as a drive power source;
a hydraulic actuator having, as a hydraulic pressure source, a hydraulic pump configured to be driven by the electric motor; and
a power supply port configured to connect/disconnect with a power supply cable; and
wherein:
in the case where the power supply cable for supplying electric power from an external power supply is connected to the power supply port and rotation of the electric motor is stopped, the battery can be charged from the external power supply, and
in the case where the power supply cable for supplying electric power from an external power supply is connected to the power supply port and rotation of the electric motor is stopped, charging of the battery from the external power supply is initiated based on a determination that the rotation of the electric motor is stopped.

2. The electric work machine according to claim 1, wherein the external power supply includes a commercial power supply, and wherein the power supply port is configured to receive power from the external power supply via the power supply cable.

3. The electric work machine according to claim 2, wherein, in the case where the power supply cable is connected to the power supply port, the power supply port is configured to receive alternating-current (AC) power from the external power supply via the power supply cable.

4. The electric work machine according to claim 3, wherein in the case where the power supply cable for supplying the electric power from the external power supply is connected to the power supply port, where the rotation of the electric motor is stopped, and where a cut-off lever for restricting an operation of the hydraulic actuator is rotated upward by blocking a pilot pressure used to operate the hydraulic actuator, so as to restrict the operation of the hydraulic actuator, the battery cannot be charged from the external power supply.

5. An electric work machine including:
an electric motor configured to receive power from a battery as a drive power source;
a hydraulic actuator having, as a hydraulic pressure source, a hydraulic pump configured to be driven by the electric motor; and
a power supply port configured to connect/disconnect with a power supply cable; and
wherein:
in the case where the power supply cable for supplying electric power from an external power supply is connected to the power supply port and rotation of the electric motor is stopped, the battery can be charged from the external power supply, and
in the case where the power supply cable for supplying the electric power from the external power supply is connected to the power supply port, where the rotation of the electric motor is stopped, and where a cut-off lever for restricting an operation of the hydraulic actuator is operated so as to restrict the operation of the hydraulic actuator, the battery cannot be charged from the external power supply.

6. An electric work machine including:
an electric motor configured to receive power from a battery as a drive power source;
a hydraulic actuator having, as a hydraulic pressure source, a hydraulic pump configured to be driven by the electric motor; and
a power supply port configured to connect/disconnect with a power supply cable; and
wherein:
in the case where the power supply cable for supplying electric power from an external power supply is connected to the power supply port and rotation of the electric motor is stopped, the battery can be charged from the external power supply, and
in the case where the power supply cable for supplying the electric power from the external power supply is connected to the power supply port, where a cut-off lever for restricting an operation of the hydraulic actuator is operated so as to restrict the operation of the hydraulic actuator, the battery cannot be charged from the external power supply.

7. The electric work machine according to claim 5, wherein the external power supply includes a commercial power supply, and wherein the power supply port is configured to receive power from the external power supply via the power supply cable.

8. The electric work machine according to claim 7, wherein, in the case where the power supply cable is connected to the power supply port, the power supply port is configured to receive alternating-current (AC) power from the external power supply via the power supply cable.

9. The electric work machine according to claim 6, wherein the external power supply includes a commercial power supply, and wherein the power supply port is configured to receive power from the external power supply via the power supply cable.

10. The electric work machine according to claim 9, wherein, in the case where the power supply cable is connected to the power supply port, the power supply port is configured to receive alternating-current (AC) power from the external power supply via the power supply cable.

* * * * *